United States Patent

[11] 3,608,734

[72] Inventor John R. Schneider
 26 Cove Road, Belvedere, Calif. 94920
[21] Appl. No. 749,003
[22] Filed July 31, 1968
[45] Patented Sept. 28, 1971

[54] LIQUID FILTERING APPARATUS
 16 Claims, 22 Drawing Figs.

[52] U.S. Cl. ................................................ 210/387
[51] Int. Cl. ............................................. B01d 25/04
[50] Field of Search .......................................... 100/198;
 55/351–354; 210/225, 230, 387

[56] References Cited
 UNITED STATES PATENTS

| | | | |
|---|---|---|---|
| 900,927 | 10/1908 | Hiegel | 100/198 X |
| 1,107,487 | 8/1914 | Brown | 100/198 X |
| 2,867,326 | 1/1959 | Hirs | 210/387 X |
| 2,933,190 | 4/1960 | Peterson | 210/230 |
| 3,499,532 | 3/1970 | Schneider | 210/387 X |

Primary Examiner—Reuben Friedman
Assistant Examiner—T. A. Granger
Attorney—Owen, Wickersham & Erickson ABSTRACT: A filtering apparatus for handling a large volume of liquid to be filtered comprising a plurality of separable pairs of liquid containers, a continuous sheet of filter media between each container pair, and means for simultaneously moving all of the sheets of filter media when the portions between pairs of containers have become contaminated with accumulated dirt or sludge. The contaminated filter sheets are moved from between pairs of liquid containers which have been separated and are advanced until fresh filter media is in place between the pairs of liquid containers. When the new filter media is in place between separated containers they are pressed together to form a fluidtight seal around their edges, the filter media being positioned so the liquid flowing into each container passes through the filter media and then through an outlet. Movement of each filter media sheet is accomplished by a series of members that engage the media and then pull it forwardly before disengaging from the media and then moving backwardly to repeat the cycle. Separate series of engaging members are provided for each filter media sheet and are coordinated by a common control apparatus.

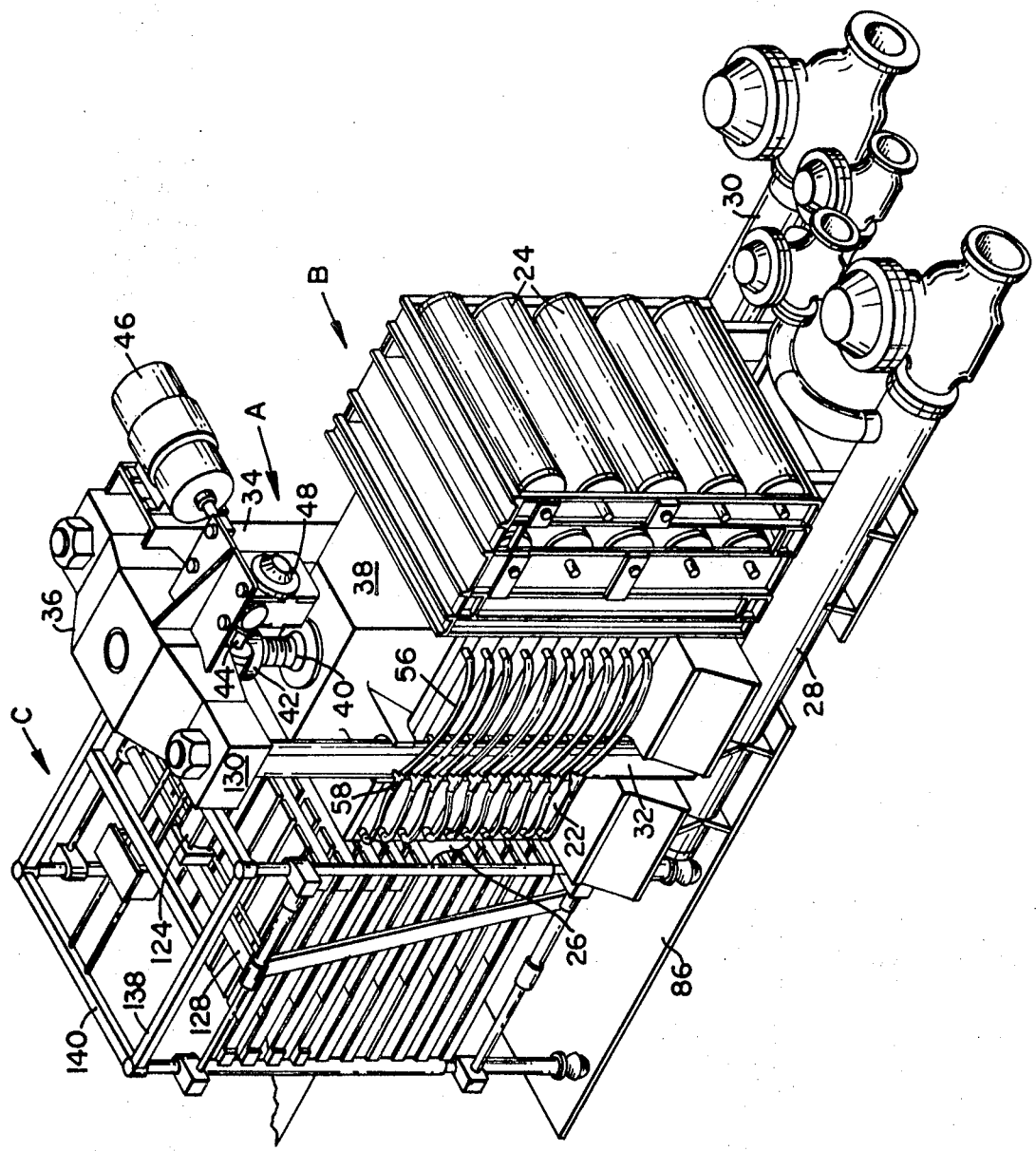
FIG_1
INVENTOR.
JOHN R. SCHNEIDER

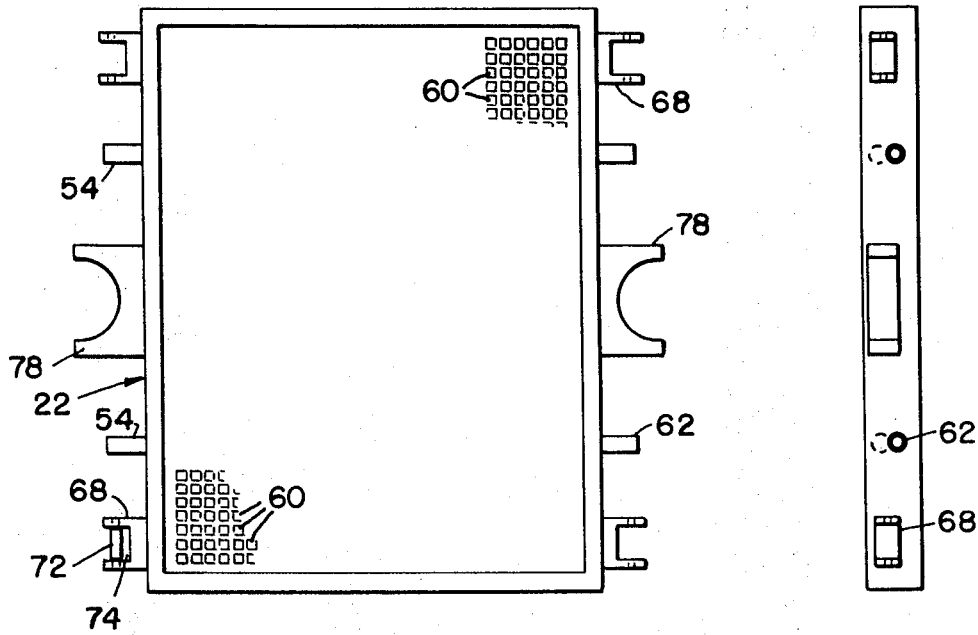
FIG_4  FIG_5
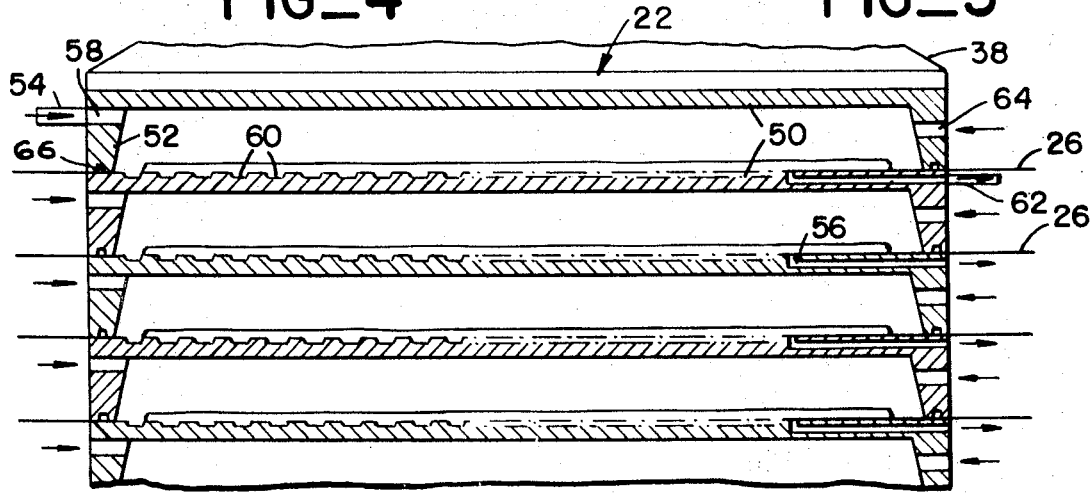
FIG_2
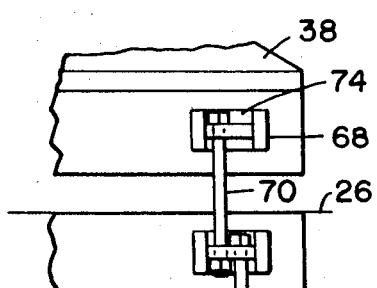
FIG_3

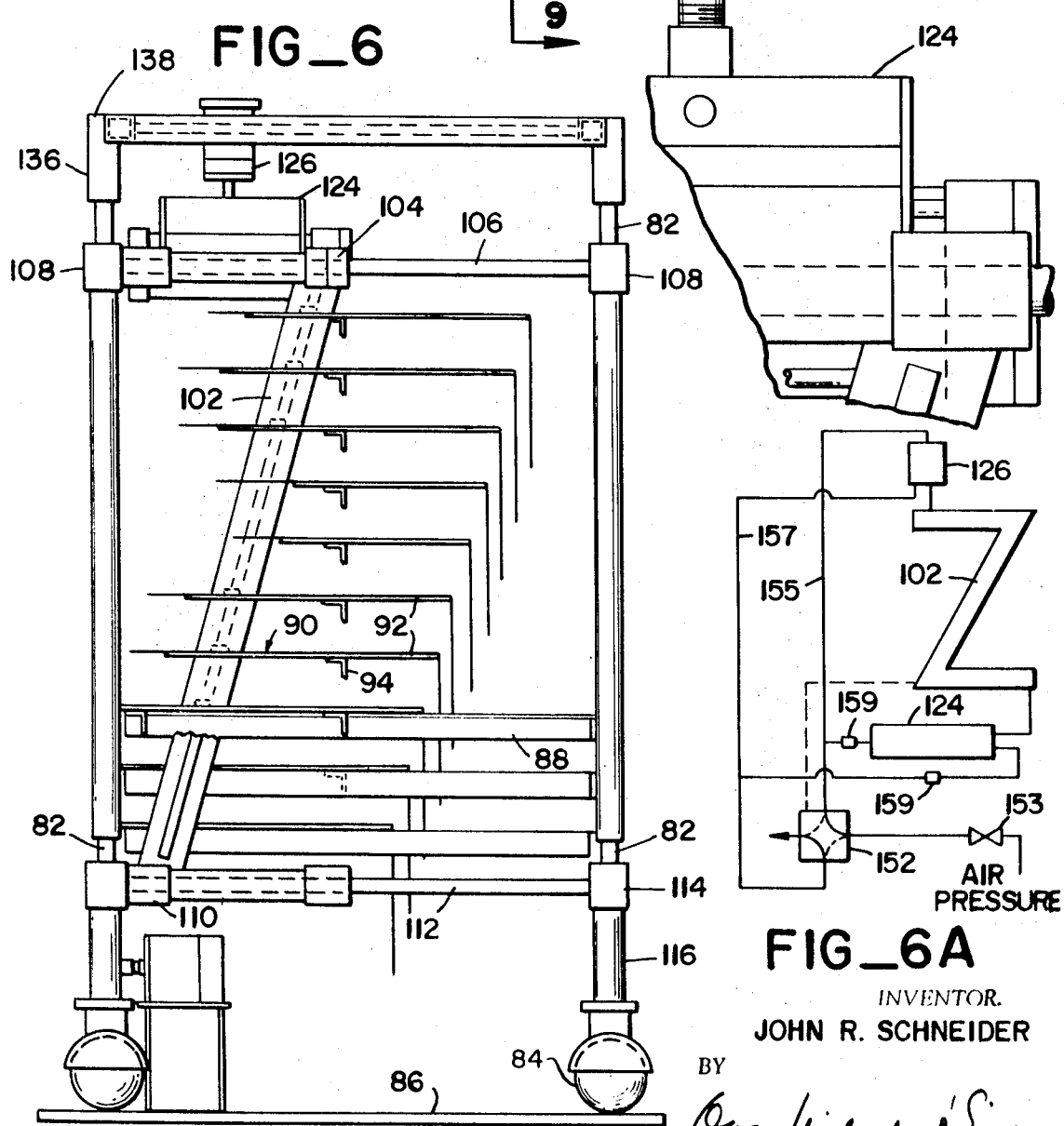

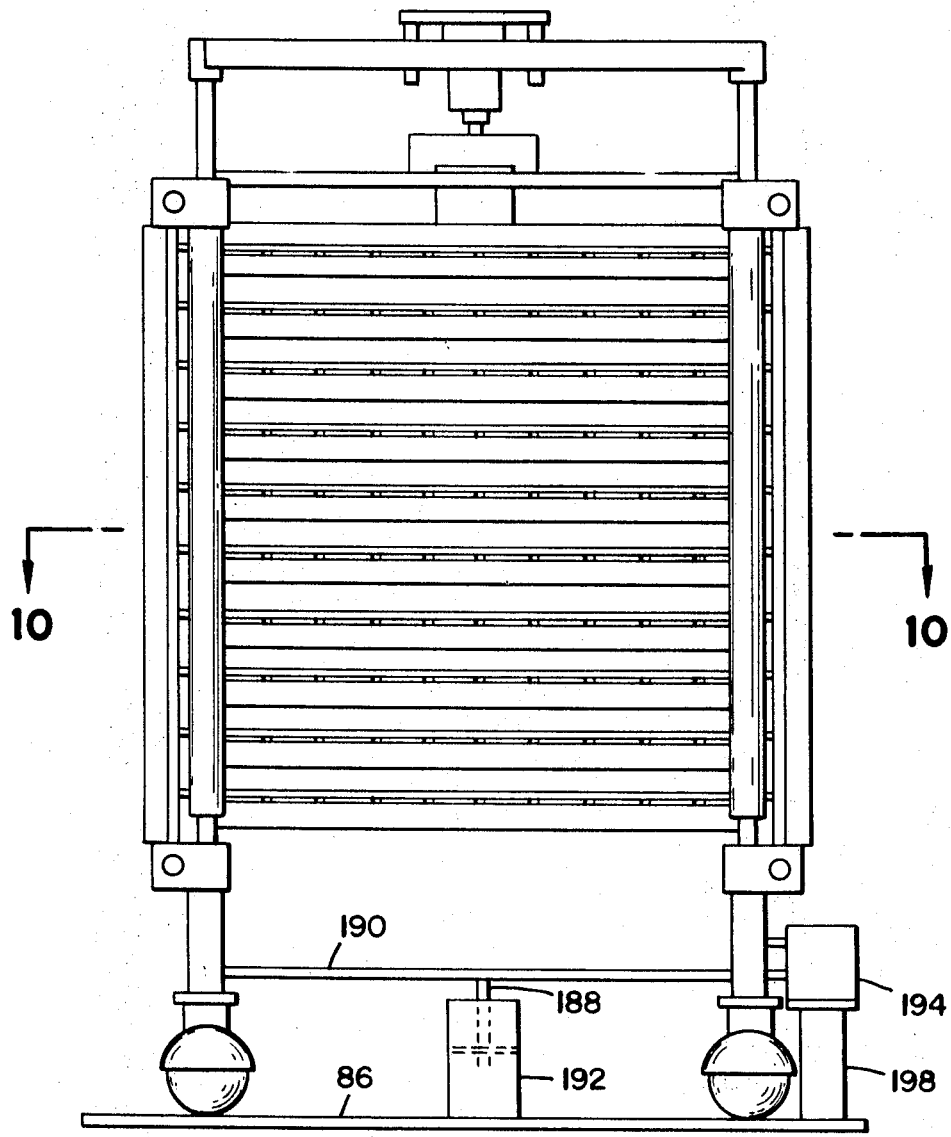
FIG_8
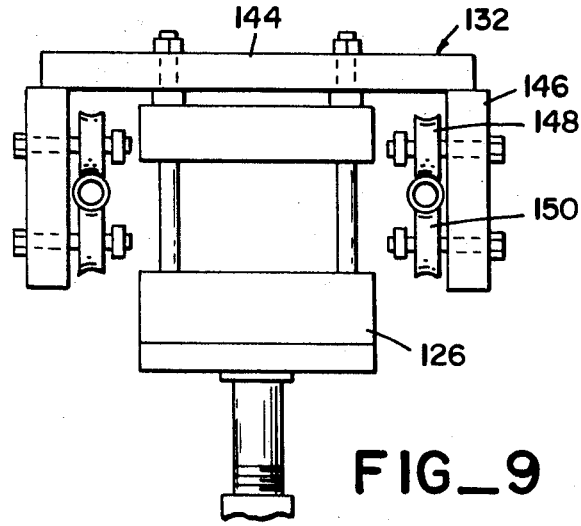
FIG_9

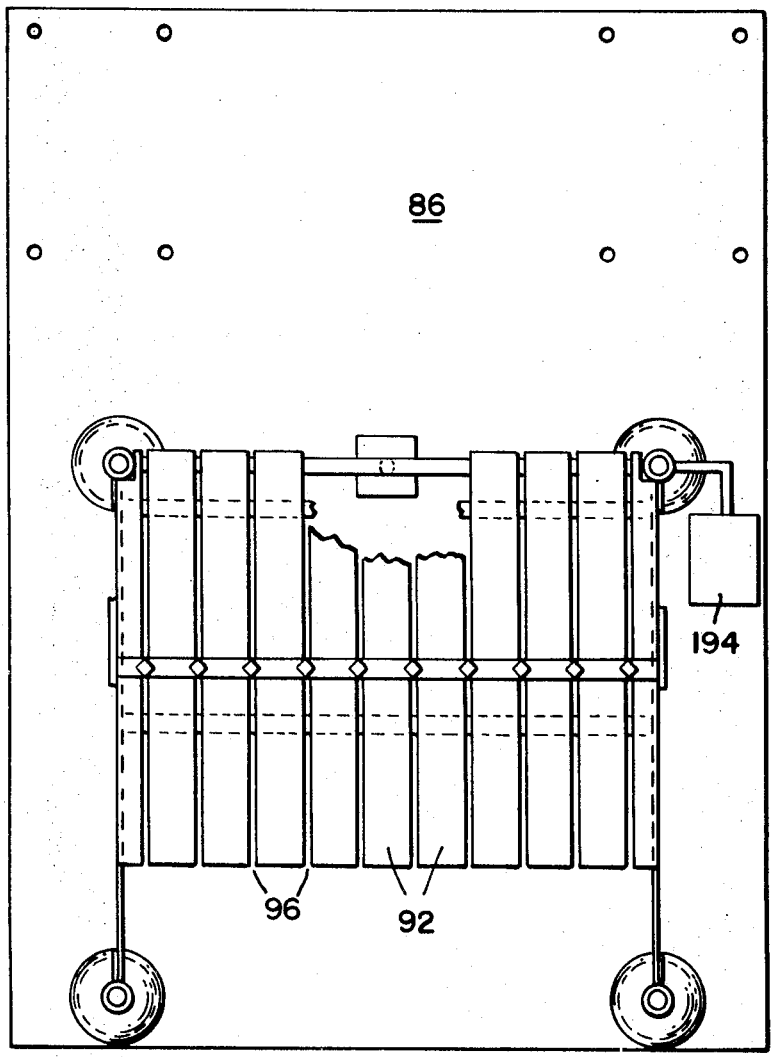
FIG_10
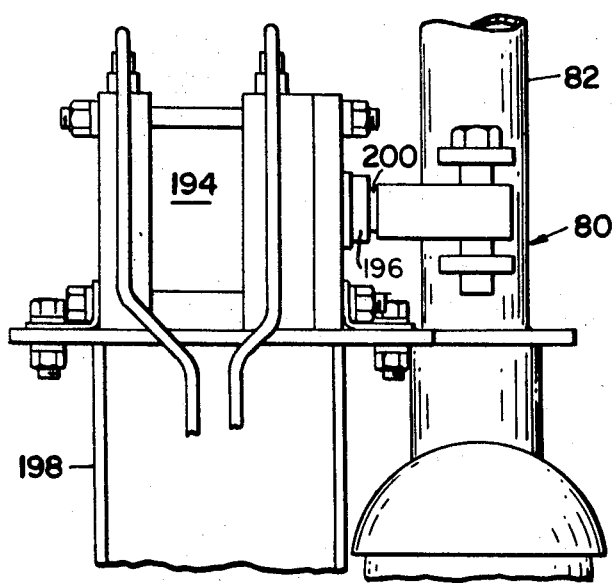
FIG_11
INVENTOR.
JOHN R. SCHNEIDER

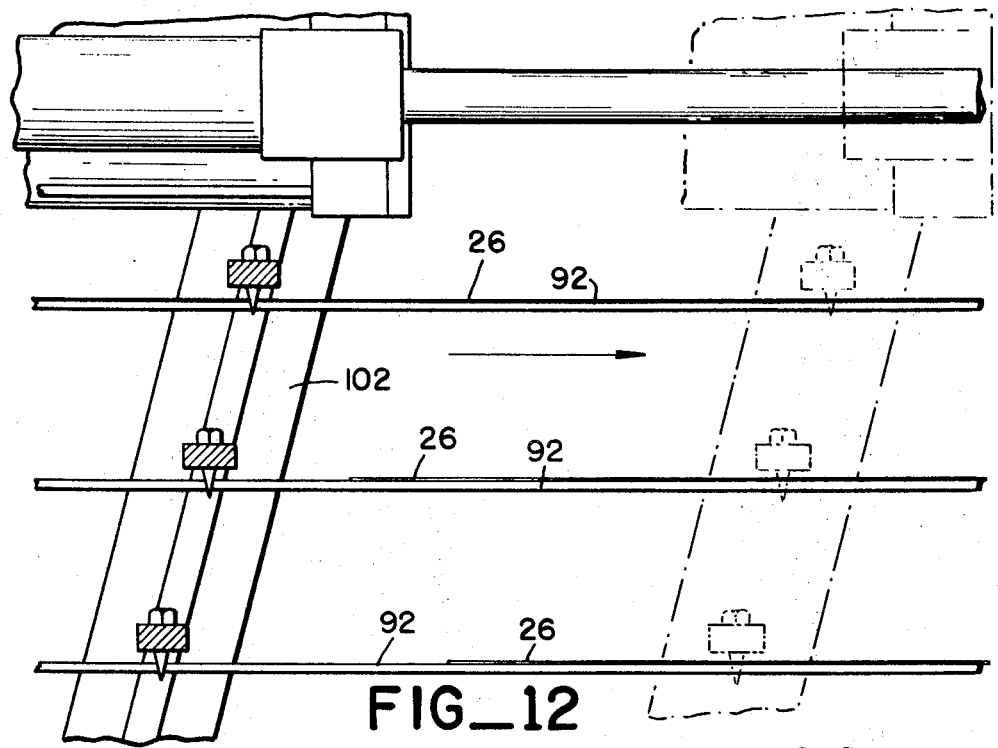
FIG_12
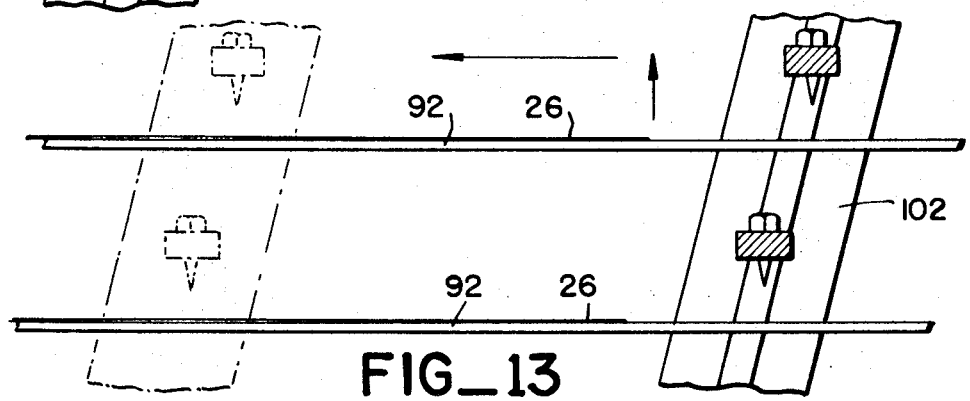
FIG_13
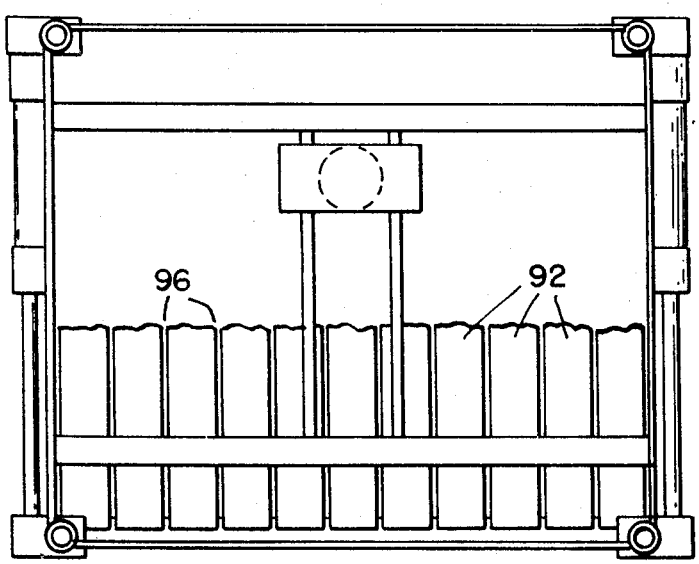
FIG_14
INVENTOR.
JOHN R. SCHNEIDER
BY
Owen, Wickersham & Erickson
ATTORNEYS

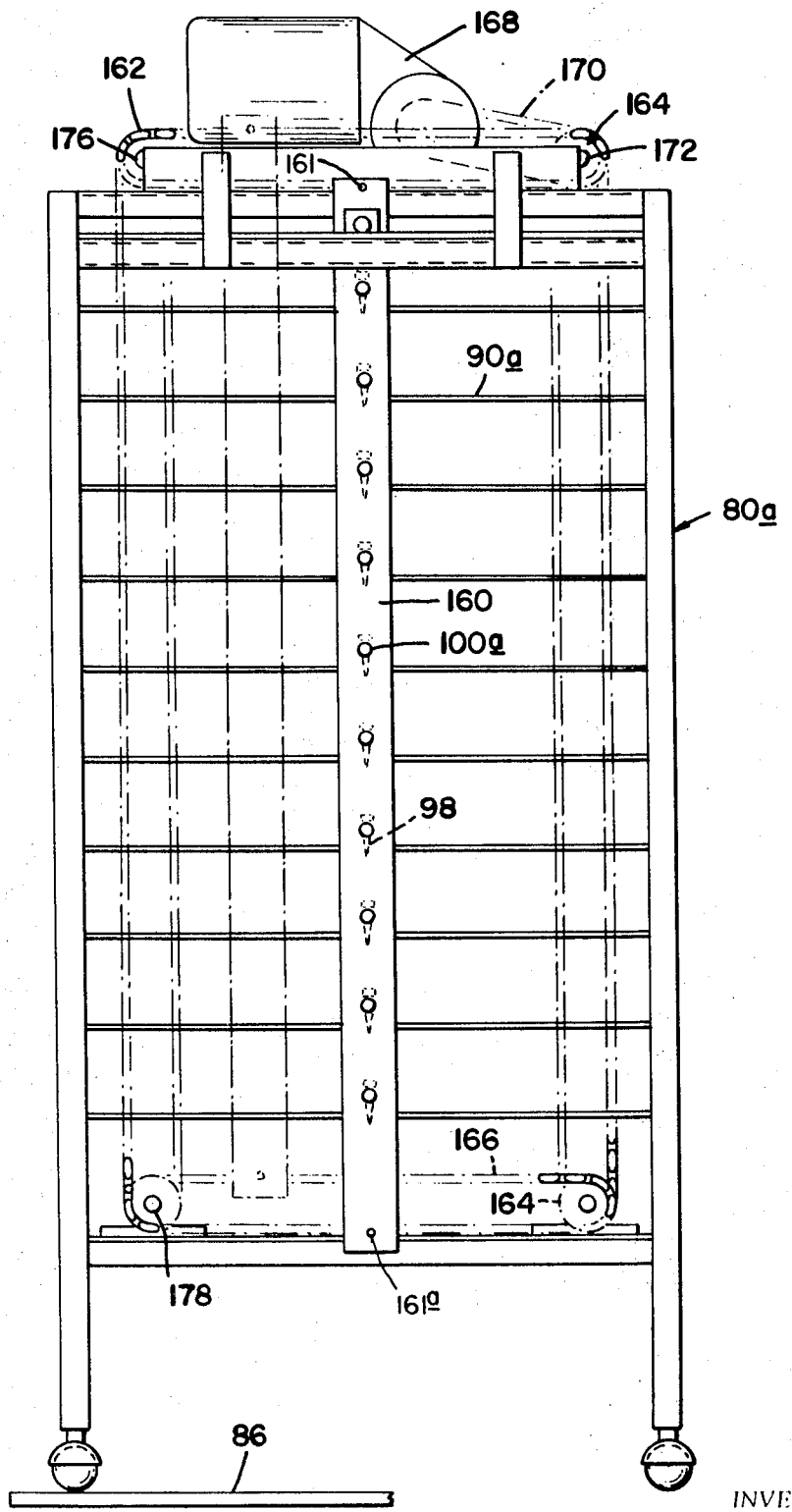
FIG_15

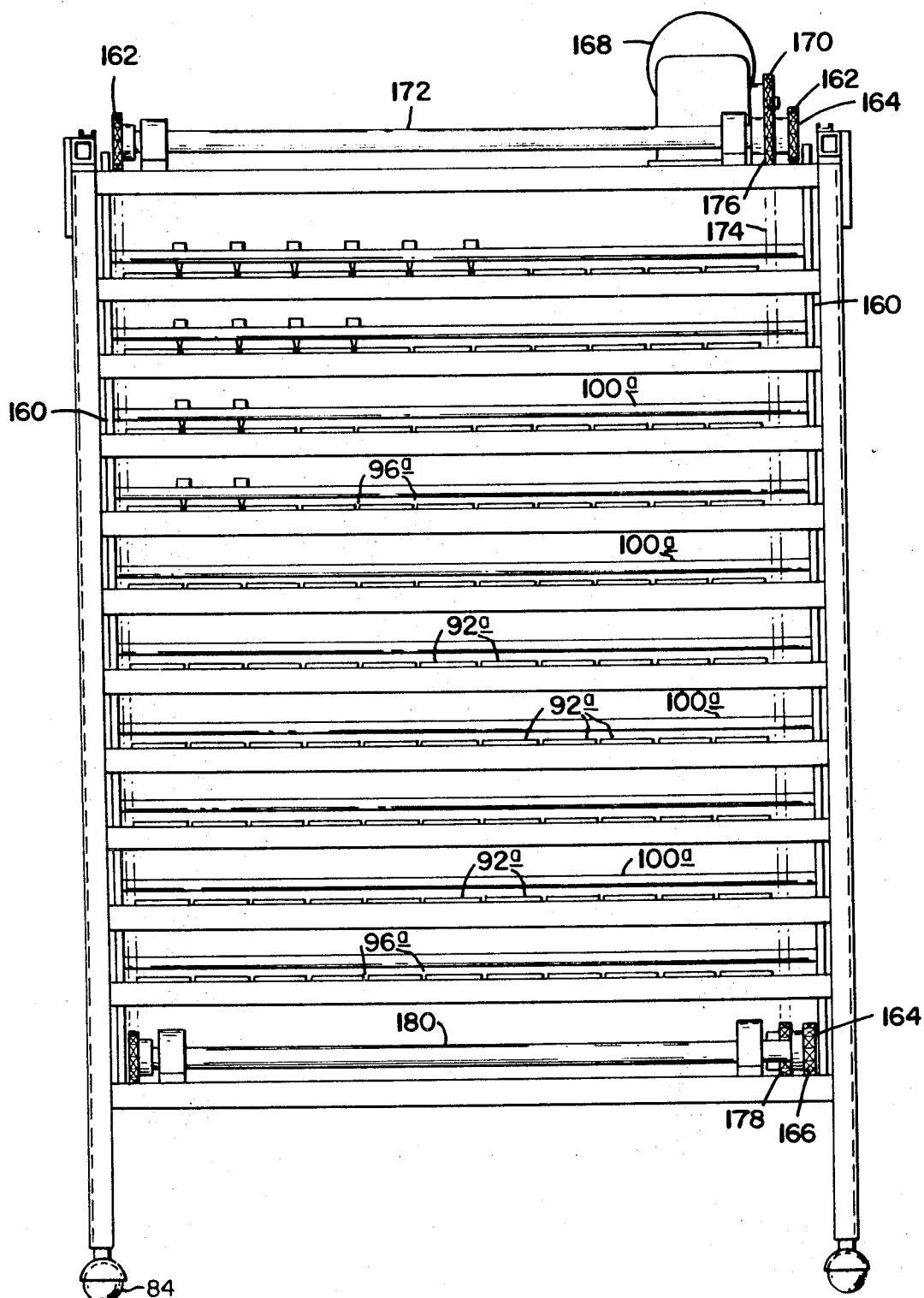
FIG_16

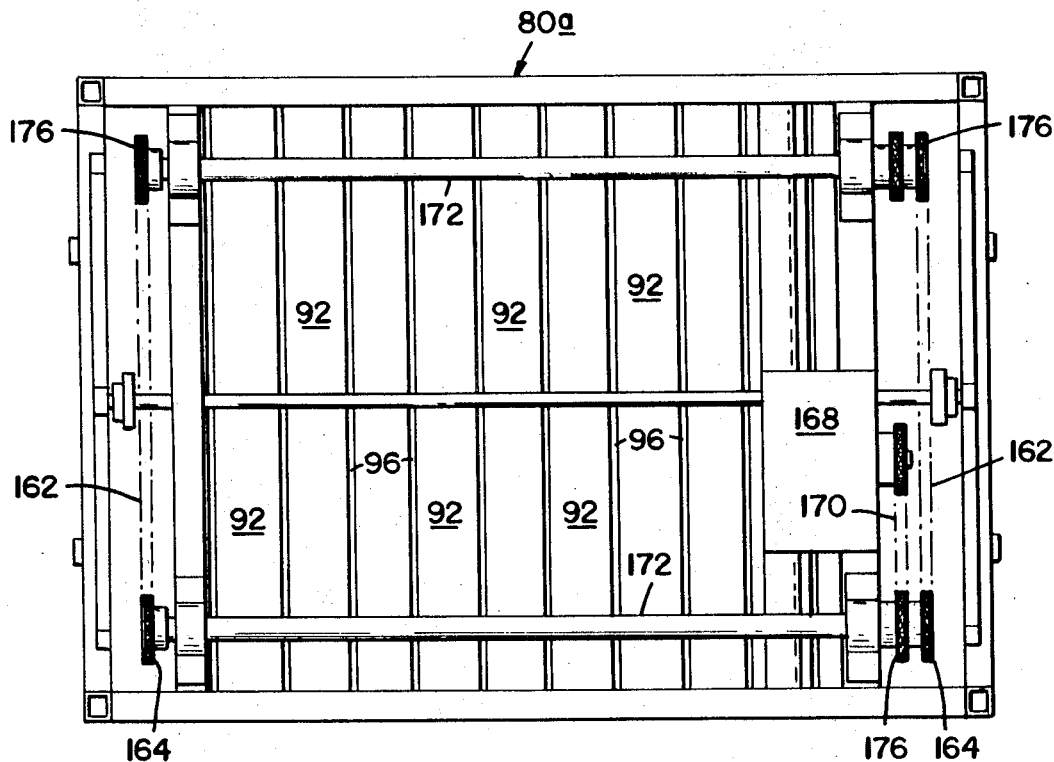
FIG_17
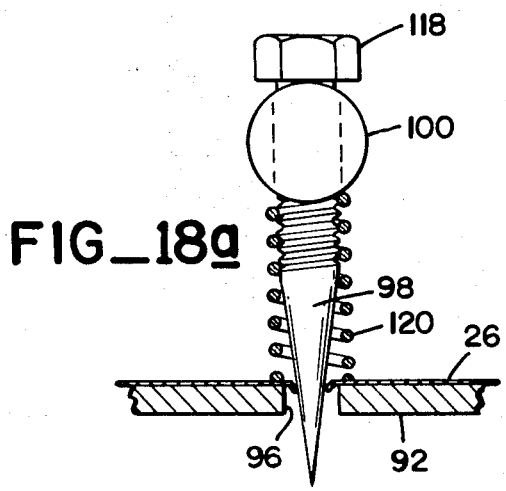
FIG_18a
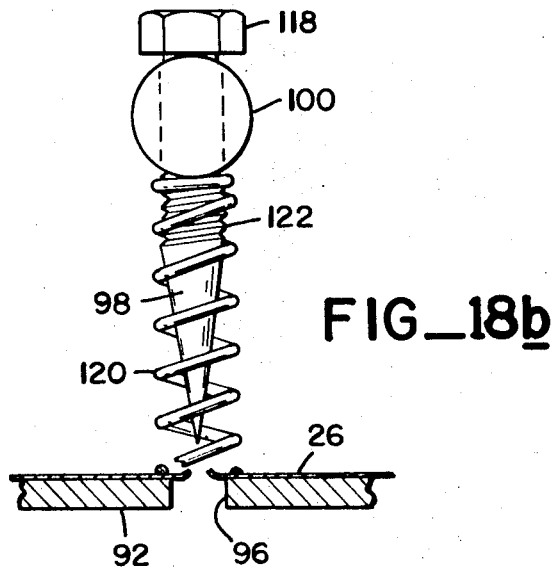
FIG_18b
INVENTOR.
JOHN A. SCHNEIDER

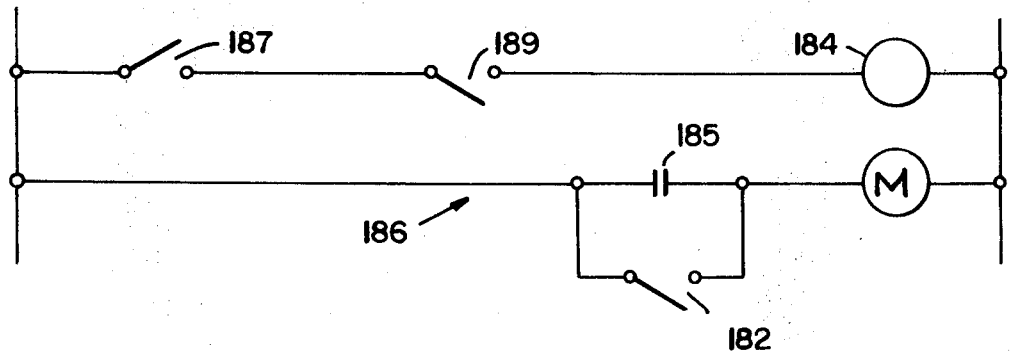
FIG_19
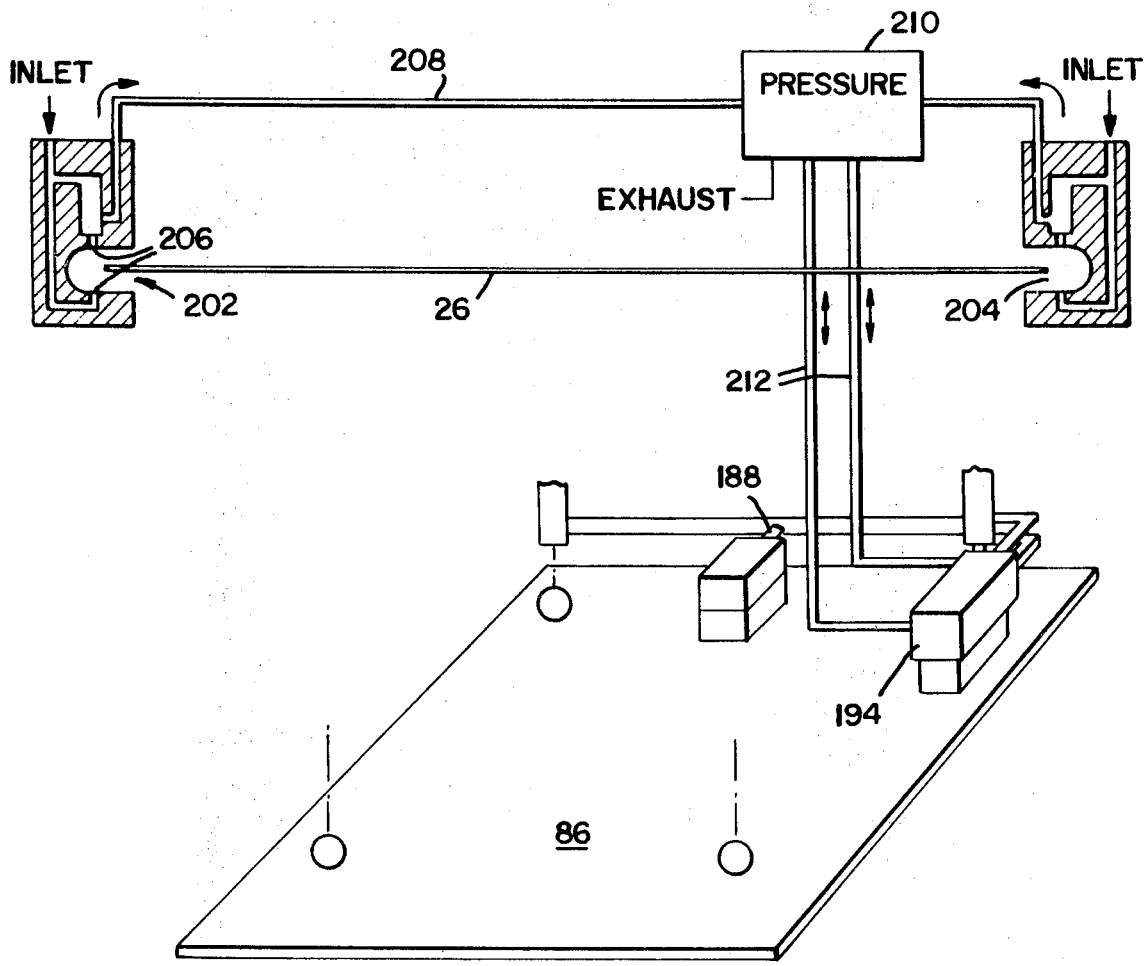
FIG_20

LIQUID FILTERING APPARATUS

This invention relates to an improved liquid filtering apparatus of the plate type commonly referred to as the "plate and frame type" filter, and more particularly it relates to means for removing used filter media and supplying fresh filter media to the filtering apparatus.

Such filter, which essentially comprise a series of liquid containers with separate inlets and outlets connected in parallel to main inlet and outlet conduits, are particularly useful for filtering relatively large volumes of liquid such as coolants and lubricants used in various industrial processes. In some installations this filter arrangement provides a central filter system capable of handling the needs of a large number of machines. However, to provide such installations where large volumes of contaminated liquid must be cleaned for reuse and high flow rates are encountered, it has long been a problem to provide practical and efficient means for cleaning the filter and replacing the filter material so that the filtering operation can proceed with a minimum of downtime.

One object of the present invention is to provide a plate and frame-type filter that has an unusually large filtering capacity, that can accommodate relatively high liquid flow rates and yet provide a high filtration efficiency including polishing filtration.

Another object of the present invention is to provide a filtering apparatus having a large capacity coupled with a relatively low cost per unit of filtering area.

Still another object of the present invention is to provide an apparatus in which the filtering area can be readily increased without altering or eliminating any of its operating features.

Another object of the present invention is to provide an apparatus in which a plurality of used sheets of filtering media for a plurality of separable containers can be removed simultaneously and clean-filtering media can be advanced and positioned between pairs of plates.

A further object of the present invention is to provide an apparatus that will simultaneously advance a plurality of layers of filtering media between pairs of separable plates in a multiplate filtering apparatus without requiring manual handling or adjustment and which will maintain the layers of media in proper alignment between the filtering plates as they are being advanced.

The foregoing and other objectives of the present invention are accomplished by a filtering device which generally comprises a plurality of pairs of horizontally arranged filtering plates formed as liquid containers which can be opened or separated simultaneously to receive a layer or sheet of filtering media and which have separate inlets and outlets that are connected in parallel, so that when the plates are closed, incoming fluid will flow through the filter media in each pair of plates and clean fluid will be collected in a manifold on the outlet side of each pair of plates. The filter media in the form of rolls of flexible sheet material is supported adjacent the horizontal plates, and on the other side of the horizontal plates therefrom is an apparatus for pulling the filter media and maintaining the alignment of each with the plates when the filter media is to be changed. The pulling means simultaneously advances each sheet of filter media by engaging it with a series of pinlike members that penetrate the sheet, pull it ahead, then disengage from the sheet and move backwardly to engage the sheet again before moving forward in another cycle. The entire filter media feed mechanism is arranged so that all of the sheets of filtering material can be adjusted in alignment with the pairs of plates whenever any misalignment should occur, and this assures the sealing of each pair of plates during the flow of liquid through the filter.

Other objects, advantages, and features of the present invention will become apparent from the following description presented in conjunction with the accompanying drawings, in which:

FIG. 1 is a view in perspective of a filter apparatus embodying the principles of the present invention;

FIG. 2 is an enlarged fragmentary view in elevation and in section of a portion of the filtering section showing a series of filtering plates in position for normal filtering operation;

FIG. 3 is an enlarged fragmentary view showing the filtering plates of FIG. 2 when the plates are separated to allow for advancement of the filtering media;

FIG. 4 is a plan view in reduced scale of a single-filtering plate;

FIG. 5 is a view in side elevation of the filtering plate shown in FIG. 4;

FIG. 6 is a view in side elevation of the filter media-advancing mechanism according to one embodiment of the present invention with portions broken away;

FIG. 6a is a schematic diagram illustrating the control of the vertical and horizontal actuators for the filter media-advancing mechanism of FIG. 6;

FIG. 7 is an enlarged fragmentary view in elevation showing a portion of the filter media-advancing mechanism of FIG. 6;

FIG. 8 is a view in front elevation of the filter media-advancing mechanism of FIG. 6;

FIG. 9 is a view in section taken along line 9—9 of FIG. 7;

FIG. 10 is a plan view in section taken along line 10—10 of FIG. 8, with portions broken away;

FIG. 11 is an enlarged fragmentary view showing the alignment adjustment actuator for the filter media-advancing mechanism;

FIG. 12 is an enlarged fragmentary view in side elevation and in section of the advancing mechanism showing the pins engaged in filter media for pulling;

FIG. 13 is a view similar to FIG. 12 showing the pulling pins retracted for the return stroke;

FIG. 14 is a plan view of the advancing mechanism of FIG. 8; the phantom lines show the pin carrier advanced to the end of its lateral stroke;

FIG. 15 is a view in side elevation of a modified form of filter media-advancing mechanism according to he present invention;

FIG. 16 is a view in front elevation of the filter media-advancing mechanism of FIG. 15;

FIG. 17 is a plan view of the mechanism shown in FIG. 15;

FIG. 18a is an enlarged view in section showing a pulling prong for the advancing mechanism as it appears when penetrating the filter media;

FIG. 18b is an enlarged view in section showing the prong 18a when removed from the filter media;

FIG. 19 is a portion of an electrical schematic diagram for controlling the filter media-advancing mechanism; and FIG. 20 is a schematic diagram showing the alignment control system for the filtering media-advancing mechanism.

With reference to the drawing, FIG. 1 shows a filtering apparatus embodying the principles of the present invention which as adaptable for filtering large quantities of liquid such as coolants and/or lubricants used for one or more industrial machine tools. Generally, the apparatus includes a filtering section A comprised of a plurality of separable filter containers or plates 22 arranged horizontally in a stack and located adjacent to a supply section B supporting a series of rolls 24 of flexible sheetlike filter media. On the other side of the filter section A from the supply section B is a filter media-advancing mechanism C that can be actuated to simultaneously pull a plurality of sheets 26 of filter material from the rolls 24 and forwardly between the filter containers when it is necessary to remove contaminated filter media and provide fresh filter media between them.

The liquid to be filtered is supplied from using machines through an inlet conduit 28 that extends horizontally along one lower side of the supply section B and the filter section A, and an outlet conduit 30 for filtered liquid extends along the other side thereof. At the filter section A, the inlet conduit is connected to an upright inlet manifold 32, and similarly the outlet conduit is connected to an upright outlet manifold 34. These two manifold members are liquid conduits, but they also serve as structural supports and guides for the separable filter containers 22. Fixed to and extending between the upper ends of these two manifold members is a crossbeam 36 that supports a mechanism for closing the pairs of filter containers together to seal them during operation of the filter and for separating the plates when it is necessary to clean the filter and change the filter media. This mechanism includes a top plate member 38 to which is fixed the lower end of a centrally located jackscrew 40. The upper end of the jackscrew is threadedly engaged to a worm gear section (not shown) which is rotatably mounted within a sleevelike housing 42 fixed to the crossbeam 36. Extending within the housing and meshed with the sector is a worm gear shaft 44 driven by an electric motor 46 that is supported by the crossbeam and one manifold member. When the motor operates to turn the shaft 44 through a suitable transmission 48, the worm gear sector also rotates, thereby causing the jackscrew to move axially and raise or lower the top plate 38 relative to the crossbeam 36. Details of the aforesaid drive mechanism for lifting the top plate relative to the crossbeam have not been illustrated since is specific components and functions are well known and may be ascertained through application of conventional engineering procedures.

The horizontal filter containers or plates 22 are stacked vertically and when held together, form a series of separate filter compartments. In FIG. 2, the containers are shown when pressed together in their position for filtering with a sheet of filter media 26 between pair of adjoining plates. Each filter plate or container comprises a rectangular central plate portion 50 with downwardly extending sidewalls 52. A pair of inlet pipes 54 are provided near the top of one sidewall 52 on each container 22 for bringing in fluid to be filtered. As shown in FIG. 1, these inlet pipes are each connected by a flexible hose 56 to a "T" fitting 58 on the upright inlet manifold 32. The top of each central plate portion 50 which forms the bottom of a filter compartment has an irregular surface generally formed by a pattern of interconnecting surface grooves 60 within which filtered liquid is collected. At one or more locations these surface grooves, as shown in FIG. 4, connect together and feed to an outlet passage 62 which extends to one side of the container. These outlet passages are connected in the same manner by flexible hoses to the outlet manifold 34. Another passage 64 provided in a container sidewall is used to allow excess air to escape during the filtering process or to allow air to enter for drying a filter cake prior to operating the apparatus.

The sidewalls 52 preferably taper downwardly from the central plate portion 50 and terminate at a plane outer edge having a groove 66 which thus extends around the entire periphery of the filter plate. The latter groove of each filter plate is preferably connected to a vacuum pump (not shown) which is operated to seal adjoining containers 22 when they are pressed together and filtering is being accomplished.

On the opposite sidewalls each filter plate 22, a pair of U-shaped members 68 are provided for retaining connectors 70 for the plates. These U-shaped members are each provided with a crossbolt 72 between spaced-apart portions, thereby forming a slot 74. As shown in FIG. 3, bolts 70, serving as the connectors, extend through aligned slots 74 of adjacent filter plates and are provided with end nuts 76. When the top plate 38 is lifted by the drive system, the top pair of plates 22 will first separate and then lift the next lower pair of plates until all pairs of plates have separated. As the plates move up and down they are guided on the upright manifolds 32 and 34 by guide members 78 having semicircular surfaces that project outwardly from opposite sidewalls of each plate. With the plates separated the filter media sheets 26 between the plates can be advanced so that fresh filter media is placed between each pair of plates. The filter media extends beyond the outside edges of the two sidewalls and serves as a fluid seal when the plates are pressed together.

The apparatus C for simultaneously advancing all of the sheets of filter media 26 is located adjacent to the horizontally oriented filter plates 22. In the embodiment shown in FIGS. 6–14, this apparatus comprises a frame 80 having four upright members 82 which are attached to casters or rollers 84 at their lower ends. The latter are supported on a flat baseplate 86 which may be fixed to the floor adjacent the filter section B.

Fixed to and supported by the upright frame members are a plurality of vertically spaced-apart horizontal frame members 88 that support a number of shelves 90. The latter are each comprised of a series of parallel slats 92 which are supported at their ends on cross frame members 94 attached to the members 88. The slats are arranged at apaced apart intervals to form narrow elongated openings 96 of equal width between them. These latter openings are parallel with the longitudinal centerline entire filter apparatus that coincides with the direction of travel of the sheets 26 of filter media.

Each of the shelves of the filter media-advancing apparatus is substantially at the same height and therefore aligned horizontally with a pair of adjoining filter plates 22 so that it can support the continuous sheet of filter media which is removed from the plates. Mounted on the frame 80 is means for advancing all of the filter sheets simultaneously which comprises a plurality of tapered pinlike members 98. These are mounted on a series of crossbars 100 that extend transversely across the sheets of filter media, there being one bar for each sheet. The bar is manipulated by a mechanism so that at one stage of operation its pins are pushed downwardly to penetrate the filter media while extending into the elongated openings 96 between slats 92. While still engaged with the paper 26, the pins move forwardly and thereby pull the paper media along, thereby moving the used sheet material from between the filter places and replacing it with fresh media from supply rolls. After completion of a pulling stroke, the crossbar 100 and its pins are retracted upwardly from the filter media and then longitudinally back toward the end of the shelf nearest the filter plates. Here, the pins are again forced downwardly into the filter media and then forwardly in another pulling cycle. These cycles for pulling the filter media are continued until all of the used material is removed from between the filter plates.

In the embodiment of FIGS. 6 to 14 the crossbars 100 for each shelf are fixed at their ends to a pair of inclined members 102 which are movable along the sides of the frame 80. On each side of the advancing apparatus the upper end of the inclined member is fixed to a sleeve member 104 which is slidable on a horizontal shaft 106 extending between a pair of vertical bearing sleeves 108 which are slidable vertically on the upright frame members 82. The lower end of the inclined member 102 is similarly fixed to a sleeve member 110 which is movable horizontally on a shaft 112 that extends between a pair of lower bearings 114 which are slidably supported for vertical movement on upright frame members 82. In their lowermost position the latter bear on the upper end of a vertical frame member 116 which supports the lower end of a vertical member 82 at each corner of the apparatus. Thus, as seen in FIG. 6, the inclined members 102 on each side of the apparatus with their upper and lower sleeve members form a Z-shaped frame which is movable longitudinally along the upper and lower rods 106 and 112 while also being movable up and down on the vertical rods 82. The pinlike members 98 are preferably made of a durable metal and are tapered downwardly to a fairly sharp point so that they will enter the filter media easily. The upper end of each pin member extends upwardly through a crossbar 100 and may be secured thereto by suitable nut 118. The pins are spaced along each crossbar so as to be aligned with the elongated openings 96 on each shelf. When the crossbar moves downwardly causing the pin members to penetrate the filter media and extend into the elongated opening 96, there may be a tendency for some pins to stick in the filter media when they are later moved upwardly at the end of their pulling stroke. This is overcome by attaching a stripper spring 120 on at least some of the pins for each crossbar. As shown in FIGS. 18a, this spring is attached to a threaded upper end portion 122 and extends to near the lower tip of the pin. The spring is compressed as the pin is inserted into the filter media, and as the pins are retracted the stripper spring continues to bear against the media to hold it against its shelf.

To provide the force for moving the Z-shaped frame members and thus the pin members 98 in their predetermined path, a pair of pneumatic actuators 124 and 126 are provided at the top of the apparatus. The first pneumatic actuator 124 for providing longitudinal movement is fixed at its cylinder end to an upper cross frame member 128 that extends between the sleeve members 104, and its piston end is fixed to a crossmember 130 fixed at opposite ends to the sleeves 108 (see FIG. 1). The piston end of the second pneumatic actuator 126 which is oriented in the vertical axis, is fixed to the cross frame member 128 between the sleeve members 104. However, the cylinder end of the actuator 126 is connected to a movable lifting mount 132 supported on a pair of spaced-apart rods 134 attached to an upper frame section 136 on the apparatus. This latter frame section comprises upright members 138 fixed to the upright members 82 and connected at their upper ends by side and end frame members 140 and 142. The supporting rods 134 are fixed at their ends to the end frame members 142. The lifting mount, as shown in FIGS. 7 and 9, comprises a top plate 144 to which the cylinder of the second actuator is fixed and having an attached pair of sideplates 146. On each of the latter plates are a pair of upper grooved guide rollers 148 that fit on a top side of each guide rod and a similar bottom roller 150 on the bottom side of each guide rod.

The two actuators 124 and 126 are controlled by a mechanical four-way valve 152 to operate the crossbar pin carriers 100 in the sequence of movements which advance sheets of filter media in accordance with my invention. As shown schematically in FIG. 6a, the four-way valve 152 is mounted in a convenient location on the apparatus frame in line with an actuating member attached to one of the Z-frames. Air from a pressure source is supplied to the valve through a solenoid operated main valve 153. In one position, the valve 152 supplies air through a conduit 155 to both the top of the vertical actuator 126 and to one end of the horizontal actuator 124. In its alternate position, the valve 152 supplies pressure through a conduit 157 to the bottom of the vertical actuator and to the opposite end of the horizontal actuator. In each of a pair of branch conduits from the conduits 155 and 157 to both ends of the horizontal actuators is an adjustable reducer 159. These reducers throttle the airflow and thereby function as time delay devices by causing the horizontal actuator to operate slower than the vertical actuator. When the Z-frames move to the position shown in FIG. 6, the valve 152 is actuated by a follower (not shown) on the Z-frame to be placed in the position shown in FIG. 6a. Thus, air pressure flows through the conduit to the top of the vertical actuator which causes it to move the Z-frames, and thus the pins 98 downwardly into the sheets filter media. Simultaneously, air pressure flows through the reducer 159 at a slower rate to the horizontal actuator which after a slight delay moves the Z-frames forwardly on their guide rods 134 with the pins pulling the sheets of filter media. When the Z-frames reach their full forward position, the follower trips the four-way valve 152 to its alternate position. This changes the airflow to the vertical and horizontal actuator causing the former to retract the pins 98 upwardly and move the Z-frames and the pins back again to the starting position. As long as the filter media-advancing apparatus operates, the valve 152 continues to control the two actuators through their sequence of operations and thus the Z-frame members, the crossbars and their pins continue to penetrate, pull, retract from the filter media sheets, and move back to the starting position for as many cycles as necessary to advance the filter media sheets. The action of the pins 98 as they function during each cycle as just described is illustrated in FIGS. 12 and 13. FIG. 12 shows the pins first in their penetrated position and at the end of their pulling stroke in phantom. FIG. 13 shows the pins retracted at the end of a pulling stroke and returned to their starting position in phantom.

An alternate arrangement for controlling the action of the pins for pulling a plurality of filter sheets is shown in FIGS. 15 and 17. In this embodiment a frame 80a is provided having a plurality of shelves 90a comprised of slat members 92a spaced apart to form slots 96a between them as previously described. However, the crossbars 100a, each supporting a plurality of pins 98, are fixed at spaced apart intervals to a pair of movable side bars 160 located on opposite sides of the apparatus. The latter are vertically oriented, their upper ends being pivotally connected to a pair of upper chains 162 located on opposite sides at the top of the apparatus by suitable means such as pins as shown at 161 in FIG. 15. Each of the upper chains extend around a pair of sprockets 164 of equal size which are mounted on the apparatus on 80a. The lower ends of the side bars 160 are similarly connected by pin means 161a to a pair of lower chains 166, each of which extends around a pair of sprockets 164a which are identical to those for the upper chains. The upper chains 162 are driven by an electric motor 168 mounted on the upper end of the apparatus by means of a drive chain 170 connected to a shaft 172 on which the sprockets 164 of the upper chains are attached. A connecting chain 174 extends from another sprocket 176 on the shaft 172 down to a similar sprocket 178 on a shaft 180 supporting the sprockets 164a for the lower chains 166, thereby driving the lower chains. The upper and lower chains are all of the same size and extend around sprocket wheels of the same size which are fixed to the apparatus frame at the same distances apart. Therefore, the upper chains move at the same speed as the lower chains, and the side bars 160 also move in unison at the same speed and in essentially a rectangular path when viewed in side elevation as in FIG. 15. As the chains move upwardly around the idler sprockets 164 at one end, the side bars 160 move up and retract the pins 98 from the filter media. Then, without stopping the side bars move rearwardly towards the filter plates before turning downwardly to penetrate the filter media again. From this position the side bars move smoothly from their downward movement into their forward horizontal travel, pulling the filter media forwardly. The movement of the side bars and thus the pulling of the pins may be allowed to continue through as many cycles as desired until the only clean filter media is positioned between the pairs of filter plates 22. When the advancing cycling is completed it has been found to be desirable, if not essential, that the pins 98 be engaged in the filter media 26 so hat when the filter plates 22 close, no contaminated filter media can be pulled back between them.

To assure that the advancing apparatus will always stop when the pins 98 are engaged with the sheets of filter media, a limit switch 182 is provided in parallel with a time delay relay 184 in the motor control circuit 186, as shown in FIG. 19. In this circuit a programmer switch 187 is closed by a sequence timer (not shown) that controls the sequence of events for cleaning the filter. A safety switch 189 is provided in series with the start switch which will remain open and prevent the filter media apparatus from operating until the filter plates are wide open. When both the switches 187 and 189 are closed, the time delay relay 184 is energized, closing a pair of contacts 185 in a lead, in parallel with the limit switch 182. The time delay relay may be set to stay closed for a predetermined number of cycles or chain revolutions depending on what length of filter media is to be removed from the filter plates. The limit switch 182 is actuated by a contact cam member (not shown) which may be attached to the drive chain at any convenient location so that when the pins 98 are fully engaged with the filter media the cam member will open the limit switch, and when the pins are disengaged it will close the limit switch. Thus, despite the number of cycles afforded by the time delay relay, if this relay should actuate to open the contacts 185 at a time when the pins are not engaged, the motor (M) will continue to operate by virtue of the circuit through the limit switch 182 until the pins engage the filter media, at which point the chain contact cam member will open the limit switch and stop the motor.

As the plurality of filter sheets are pulled forwardly from their supply rolls 24 by the advancing apparatus, they must all be kept in proper alignment so that they are always engaged by the sealing edges of the sidewalls 52 of each pair of filter plates 22. If for some reason the sheets 26 should commence to angle away slightly from the absolute longitudinal centerline of the filter plates as they are being advanced, this angular discrepancy must immediately be corrected and counteracted. Otherwise, the filter media will soon be displaced between the filter plates 22 by an amount that would prevent an adequate seal.

In the present invention the proper alignment of the filter sheet material is maintained by manipulating the movable frame 80 on its flat baseplate 86. As previously described, the frame is supported on four wheels or casters 84 that are mounted to swivel freely on the legs of the frame. As shown in FIGS. 8 and 10, the frame 80 is also connected by a vertical pivot pin 188 to the baseplate. This pivot pin, which is on the longitudinal center line of the filter section A, is fixed to a horizontal transverse frame member 190 extending between the upright frame members nearest the filler section. The pivot pin extends downwardly and is rotatable in a pivot support housing 192 fixed to the baseplate 86.

Other arrangements for supporting the movable frame 80 so that it can pivot about a vertical axis may be provided within the scope of the invention.

To adjust the angular position of the filter media-pulling frame 80, an actuator 194 is provided to move it in either direction about the pivot pin 188. This actuator has a cylinder portion 196 fixed by a support mount 198 to the baseplate 86, and its piston 200 is connected to the lower end of an upright frame member 82. (See FIG. 11). When the actuator 194 is energized, the movement of its piston will cause the frame 80 to pivot on its baseplate 86 about the pivot pin 188, and this will affect the direction in which the filter media is pulled. The amount of movement of the positioning actuator piston 200 is controlled by a suitable sensor device 202, such as a fluidic-type sensor of the type commercially available. As shown schematically in FIG. 20, a pair of such sensors are provided on opposite sides of the filter apparatus where the filter media leaves the filter section A. Each sensor includes a horizontal slot 204 into which the edge of the filter media extends. Within this slot are opposing ports 206 providing transverse air jets from a common source. If the filter media sheet, horizontally aligned with the sensors, starts to move to one side of its normal direction of travel and an edge thereof moves farther into the slot, it interrupts the opposing jets. This causes an increased air pressure through a signal passage 208 which is supplied to a conventional fluidic four-way control valve 210. Like the sensors, this valve may also be of a conventional type that operates automatically in response to the sensor signal to direct air to one of two outlets. Thus, the valve 210 receives air on one side from a pressure source and has an exhaust port on its other side. A pair of conduits 212 extend from the valve 210 to opposite ends of the actuator 194. A signal supplied to the four-way valve from either of the sensors, causes the valve to supply working air pressure through either one of the conduits 212 to the appropriate end of the actuator 194. This moves the entire frame 80 causing the filter media sheets 26 to be pulled at a slightly different angle, thereby correcting the misalignment and causing the test sheet to move out of the sensor slot 204 until it becomes properly aligned with the longitudinal axis of the entire filter apparatus. Since all of the sheets of filter media are pulled in the same direction and in the same manner, they will all stay vertically aligned with each other and it is necessary to provide sensors for only one sheet. Thus, the alignment of all the sheets of filter media is maintained automatically and to a high degree of accuracy.

In the operation of the filter, the sheets of filter media are drawn from their supply rolls and between the filter plates which are separated during shutdown as the top plate is raised by the drive motor and its jackscrew mechanism. Although only one stack of horizontal filter plates are illustrated, it is obvious that the capacity of the filter apparatus can be readily increased by utilizing additional stacks of similar filter plates.

The filter media extending between the filter plates is engaged by the filter media advancing apparatus so that the pins on each crossbar penetrate and firmly hold each sheet of filter media. The drive motor 46 on the filter section is now energized to lower the top plate 38 and press the pairs of containers or plates 22 together. When the edges of the sidewalls of adjoining filter plates bear against the filter media, a fluid-tight seal is established between them. The fluid to be filtered is now brought to the filter plates through the inlet conduit 28 and the upright inlet manifold 32. In each pair of filter plates the fluid fills the upper chamber and then is forced downwardly through the media 26 and out the outlet 62.

When the filter media has accumulated an amount of contaminating material which requires it to be replaced, the flow of material to be filtered to the filter section is stopped. Air is then introduced to dry the cake in each filter chamber. The filter jack motor 46 is energized and the filter plates 22 are lifted and separated so that a cleaning cycle can commence and the filter media replaced between all the plates. The sequence of operations performed during the cleaning cycle may be programmed in any desired manner by conventional gang switches such as those comprised of a series of cams fixed to a shaft. As part of the cleaning cycle the filter media-advancing apparatus C is energized and commences to cycle and advance the filter media sheets in increments. As described previously, the amount of cycling and thus the amount of lineal advancement of the filter media is controlled by the predetermined setting of the time delay relay 184 plus any additional advancement afforded by the limit switch 182. During the cycling of the advancing apparatus the sensors 202 maintain the proper alignment of the filter media with the longitudinal axis of the filter section. Thus, when all the filter sheets have advanced so that only clean media is between the filter plates 22, it is positioned so that it will help form a fluid seal when the plates are pushed together. The used filter media is moved across the shelves of the advancing apparatus and into a waste bin which may be placed adjacent the end thereof. The shelves 90 are shorter in length from the top down so that the sheets of used filter media will not interfere with each other as they fall off the end of the advancing apparatus into the waste bin.

From the foregoing, it should be apparent that the present invention provides a filter apparatus capable of unusual efficiency and capacity as well as one that is relatively easy to operate and maintain. The unique and precise manner in which new filter media can be supplied to a large plurality of filter units facilitates high volume of flow and relatively short shutdown periods for cleaning and filter media replacement.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A liquid-filtering device comprising, in combination:
   a filtering section including a plurality of separable plates forming liquid containers, each said pair having an inlet and an outlet;
   inlet manifold means connecting the inlets and outlet manifold means connecting the outlets of said containers;
   a pump connected to said inlet manifold means for delivering liquid thereto for being filtered;
   conduit means connecting said inlet manifold means for removing filtered liquid from the containers;
   a filter media supply means on one side of said filtering section including a plurality of rolls of sheet-type filter media of equal width, a separate sheet of filter media from each said roll extending between a pair of said separable plates;
   a filter sheet advancing means on the other side of said filtering section from said supply means and comprising a frame;
   a plurality of vertically spaced-apart filter sheet supports on said frame having a plurality of spaced apart slots;

and means adjacent each support for extending through said slots and engaging the filter media to move it linearly and simultaneously pull all of said sheets of filter media between said pairs of plates when they are separated, thereby causing unused filter media to unwind from said rolls and move between the pairs of plates.

2. A liquid filtering device comprising, in combination:

a filtering section including a plurality of separable plates forming liquid containers, each said pair having an inlet and an outlet;

inlet manifold means connecting the inlets and outlet manifold means connecting the outlets of said containers;

a pump connected to said inlet manifold means for delivering liquid thereto for being filtered;

conduit means connecting said outlet manifold means for removing filtered liquid from the containers;

a filter media supply means on one side of said filtering section including a plurality of rolls of sheet-type filter media of equal width, a separate sheet of filter media from each said roll extending between a pair of said separable plates;

a filter sheet advancing means on the other side of said filtering section from said supply means and comprising a frame;

a plurality of vertically spaced-apart shelves supported by said frame and having a plurality of spaced-apart slots;

means above each shelf for supporting a plurality of pins;

driving means for moving said latter means in a continuously repeating path that forces said pins downwardly between said slots of each shelf then forwardly, then upwardly out of said slots and then backwardly to a starting point before repeating the cycle, whereby said pins penetrate used filter media on said shelf and pull it forwardly while engaged therewith and then retract from the media and move backwardly over it before re-entering the media for another pulling cycle.

3. The filtering device of claim 2 wherein said means for supporting said pins comprises a transverse mounting bar for each said shelf, said pins being spaced apart on said bar at the same distance apart as said shelf slots.

4. The filtering device of claim 3 wherein said driving means comprises a first pair of spaced-apart endless chains, each mounted on sprockets supported at the upper end of said frame; a second pair of endless spaced-apart chains identical to said first chains and mounted on sprockets supported on the lower end of said frame, a pair of movable side members each pivotally connected at its ends to one each of said first and second chains; and means for driving said chains at a constant rate, whereby said side members are caused to be moved forwardly and then up as said chains pass around their sprockets, and then backwardly again before moving downwardly so that said pins will reengage the sheets of filter media.

5. The filtering device of claim 3 wherein each of said pins have a shank which is tapered to a point at its outer end, at least some of said pins including a coil spring attached to its shank and extending to its outer end for removing the sheet of filter media from the pin as it is retracted from the sheet.

6. The filtering device of claim 3 including control means for said driving means comprising a manually operated stop switch and a second override switch in parallel with said stop switch and operable to open and stop said driving means when said pins are in a sheet-engaging position.

7. The filtering device of claim 3 wherein said driving means comprises a pair of movable side members, said transverse mounting bars being attached to said side members, a first linear actuator means for moving said side members and thus said mounting bars and their pins horizontally, a second linear actuator means for moving said side members vertically, and valve means for controlling both said actuator means to cause said side members to travel in a substantially rectangular continuous path.

8. The filtering device of claim 3 including means on said sheet advancing means for maintaining the sheets being advanced in alignment with the longitudinal centerline of said filtering section and thus in a fluid-sealing position between their respective pairs of separable plates.

9. The filtering device of claim 8 wherein said latter means comprises means for pivoting said frame of said filter sheet advancing means about a vertical axis spaced from said filter section; sensor means for providing a response to a variance in alignment of the filter media sheets with the longitudinal centerline of said filter section; and power means controlled by said sensor means for moving said frame of said sheet advancing means about said vertical axis.

10. In combination with a liquid-filtering device comprising a plurality of plates which, when placed together, form liquid containers, means for moving said plates together for retaining elongated sheets of filter media between adjacent plates thereby forming a pair of fluidtight chambers on opposite sides of each sheet, there being an inlet to one chamber and an outlet to the opposite chamber on the other side of the sheet, and means for separating the plates when the sheets of filter media are contaminated, a sheet advancing means adjacent the filtering device comprising:

means for simultaneously penetrating all of said sheets of filter media that extend from between said plates when they are separated and for pulling said sheets of filter media longitudinally to remove them from between the plates, said latter means including a plurality of pin members and driving means for moving said pin members vertically downwardly at a starting location to engage the sheets, then forwardly to pull the sheets, then upwardly to retract from the sheets, and then rearwardly to the starting location.

11. The sheet advancing means as described in claim 10 including:

a frame;

a plurality of vertically spaced-apart shelves supported by said frame, each said shelf being comprised of a series of spaced-apart members separated by longitudinal openings;

transverse means above each shelf for supporting a plurality of said pin members;

said driving means being operative for moving said bar means in a continuously repeating path that forces said pins downwardly between said slots of each shelf then forwardly, then upwardly out of said slots and then backwardly to a starting point before repeating the cycle, whereby said pins penetrate used filter media on said shelf and pull it forwardly while engaged therewith and then retract from the media and move backwardly over it before reentering the media for another pulling cycle.

12. The filter media sheet-advancing means of claim 10 wherein said driving means comprises a pair of movable side members, a plurality of transverse mounting bars attached to said side members, said pin members being fixed to said bars, a first actuator means for moving said side members and thus said mounting bars and their pins horizontally, a second actuator means for moving said side members vertically, and valve means for controlling both said actuator means to cause said side members to travel in a substantially rectangular continuous path, thereby pulling the filter sheets forwardly in increments.

13. The sheet-advancing means of claim 10 wherein said driving means comprises a first pair of spaced-apart endless chains, each mounted on sprockets supported at the upper end of said frame; a second pair of endless spaced-apart chains mounted on sprockets supported on the lower end of said frame, a pair of movable side members each pivotally connected to one each of said first and second chains; and means for driving said chains at a constant rate, whereby said side members are caused to be moved forwardly and then up as said chains pass around their sprockets, and then backwardly again before moving downwardly so that said pins will reengage the sheets of filter media.

14. The sheet-advancing means of claim 10 including means on said sheet-advancing means for maintaining the sheets being advanced in alignment with the longitudinal centerline of said filtering section and thus in a fluid-sealing position between their respective pairs of separable plates.

15. The sheet-advancing means of claim 10 including control means for said driving means comprising a manually operated stop switch and a second override switch in parallel with said stop switch and operable to open and stop said driving means when said pins are in the sheet-engaging position.

16. The sheet advancing means of claim 15 wherein said latter means comprises means for pivoting said driving means about a vertical axis; sensor means responsive to a lateral variance in alignment of at least one filter media sheet with a predetermined direction; and power means controlled by said sensor means for moving said frame of said sheet advancing means about said vertical axis.

UNITED STATES PATENT OFFICE
CERTIFICATE OF CORRECTION

Patent No. 3,608,734                    Dated    September 28, 1971

Inventor(s) John R. Schneider

It is certified that error appears in the above-identified patent and that said Letters Patent are hereby corrected as shown below:

Column 2, line 33, "he" should read -- the -- . Column 3, line 16, "is" should read -- its -- ; line 24, insert the word -- each -- after "between". Column 4, line 8, after the word "longitudinal" insert -- axis of the -- ; line 9, take out the word "centerline". Column 6, line 42, "hat" should read -- that -- . Column 7, line 18, "filler" should read -- filter--; Column 8, line 65, "inlet" should read -- outlet -- .

Signed and sealed this 10th day of October 1972.

(SEAL)
Attest:

EDWARD M. FLETCHER, JR.          ROBERT GOTTSCHALK
Attesting Officer                 Commissioner of Patents